(12) United States Patent
Franzen

(10) Patent No.: US 7,443,820 B2
(45) Date of Patent: Oct. 28, 2008

(54) METHOD FOR OPERATION OF A COMMUNICATION PATH BETWEEN AT LEAST TWO COMMUNICATION TERMINALS

(75) Inventor: Michael Franzen, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 526 days.

(21) Appl. No.: 10/997,242

(22) Filed: Nov. 24, 2004

(65) Prior Publication Data

US 2005/0141458 A1 Jun. 30, 2005

(30) Foreign Application Priority Data

Nov. 25, 2003 (DE) ................. 103 54 943

(51) Int. Cl.
*H04Q 7/00* (2006.01)
(52) U.S. Cl. ............... 370/332; 370/338; 370/351; 455/41.2; 455/67.11
(58) Field of Classification Search ........... 455/428, 455/41.2, 67.11–67.7, 424, 425; 370/332, 370/338, 351–356
See application file for complete search history.

(56) References Cited

U.S. PATENT DOCUMENTS 6,628,639 B1 9/2003 Ishii

2002/0049561 A1 4/2002 Garcia-Luna-Aceves et al.
2002/0086676 A1 7/2002 Hendrey et al.
2004/0022223 A1* 2/2004 Billhartz ............... 370/338
2004/0095891 A1* 5/2004 Nakagawa ............. 370/252

FOREIGN PATENT DOCUMENTS

DE 10214629 10/2003
EP 1063819 12/2000
WO WO0054539 9/2000

* cited by examiner

*Primary Examiner*—Rafael Pérez-Gutierrez
*Assistant Examiner*—Yungsang Lau

(57) ABSTRACT

A method is provided for operation of a communication path between at least two communication terminals in which, at least at a start time, the two communication terminals are connected via at least one intermediate station and interchange signals with one another via this communication path, with both the intermediate station and the communication terminals determining the quality of signal transmission from the direction of their respective predecessor station or stations. The method is characterized in that the signal transmission quality from the direction of the predecessor node is measured cyclically, and the measured signal transmission quality is transmitted at least to one adjacent intermediate station or at least to one adjacent communication terminal, and each intermediate station and each communication terminal compares its own measured signal transmission quality with the transmitted signal transmission quality, with existing connections being disconnected, and new connections being made as a function of the comparison.

24 Claims, 2 Drawing Sheets

METHOD FOR OPERATION OF A COMMUNICATION PATH BETWEEN AT LEAST TWO COMMUNICATION TERMINALS

BACKGROUND OF THE INVENTION

The present invention relates to a method for operation of a communication path between at least two communication terminals in which, at least at a start time, the two communication terminals are connected via at least one intermediate station and interchange signals with one another via this communication path, with both the intermediate station and the communication terminals determining the quality of signal transmission from the direction of their respective predecessor station or stations.

In multihop networks (multiple node networks), such as those which are being planned for the fourth generation of mobile radio networks, in addition to connections between one terminal and one base station, as used exclusively in the third mobile radio generation, connections are also possible which pass via two or more appliances, for example including other terminals, before they reach a base station or another terminal. The critical point with multihop networks is that the individual base stations, which are also referred to in the following text as hops (intermediate nodes) are connected to one another via the same air interface via which the end nodes also operate. This is the difference in comparison to conventional mobile radio networks in which the intermediate nodes are connected via cable networks or permanently installed directional radio paths.

If, by way of example, the nodes which are involved in a connection are moving, such as a node with a switching function in a vehicle, a situation may arise in which some of the intermediate nodes are unnecessary and can be removed from the connection. This may be expressed, for example, by two terminals which are alongside one another in the end effect, no longer being connected via the base station, as is normal nowadays, but communicating directly with one another.

Direct communication between two DECT connection terminals without having to communicate via a base station is already possible in the DECT (Digital European Cordless Telephone) field, that is to say for cordless telephony. However, this direct connection is not set up automatically, but manually.

One problem that arises in the optimization of a communication path between two communication terminals is to identify the capability to set up a new direct connection between the terminals, or a connection between the terminals via a better route length.

Laid-Open Specification US 2002086676 A1 has already described a method which initiates direct connections based on the knowledge of the geographical position of individual terminals. In order to allow this method to be implemented, the network, effectively as a central instance, has to know the position of the individual terminals and monitor these positions and, when necessary, has to send a request to the individual terminals to initiate a direct connection.

Furthermore, ad-hoc routing protocols exist, such as AODV (ad hoc On Demand Distance Vector routing) which use the entries in the routing tables to determine the maximum validity period for the existence of an intermediate node, after which the next intermediate node must be looked for once again. The end of this validity period, which is also referred to as a timeout, if appropriate, then leads to the initiation of new direct connections or to the confirmation of the existing next hop as the intermediate node.

The disadvantage of spatial localization of the individual terminals via the network is that the network, as the central monitoring unit, can be implemented only with a relatively high degree of hardware complexity. As such, the overall network configuration is very complex and inflexible.

Methods in which the maximum validity period for the existence of an intermediate node is determined via entries in routing tables, after which the next intermediate node must be looked for once again, have been found to have particularly high inertia. As a consequence, the power consumption during a switching action is unnecessarily high. Furthermore, the path search packets, which are transmitted cyclically like a flood wave, with this transmission generally being referred to as "flooding," result in an unnecessarily high network load.

The present invention is therefore directed toward a method for operation of a communication path between at least two communication terminals which allows a connection between communication terminals via a better route length to be set up automatically, more quickly and more effectively, than with the previously known methods, or else which allows direct connections between communication terminals.

SUMMARY OF THE INVENTION

It has been found that, as soon as the reception/transmission situation of each intermediate node and of each communication terminal is known, it is possible to improve the signal transmission on the communication path between at least two communication terminals by disconnection of intermediate stations which do not improve the transmission, or by addition of previously unused connections between intermediate stations.

On the basis of this inventive idea, it is proposed that the method which is known per se for operation of a communication path between at least two communication terminals in which, at least at a start time, the two communication terminals are connected via at least one intermediate station and interchange signals with one another via this communication path, with both the intermediate station and the communication terminals determining the quality of signal transmission from the direction of their respective predecessor station or stations, be improved such that the at least one intermediate station and the communication terminals also cyclically measure the signal transmission quality from the direction of the predecessor node to the their predecessor node, and transmit their measured signal transmission quality at least to one adjacent intermediate station or at least to one adjacent communication terminal, and each intermediate station and each communication terminal compares its own measured signal transmission quality with the transmitted signal transmission quality, with existing connections being disconnected, and new connections being made as a function of the comparison.

This makes it possible to remove one or more intermediate stations, which are generally referred to as hops, from the communication path or, if necessary, to add one or more intermediate stations to the communication path. This results in the advantage that the communication path between at least two communication terminals can be made shorter or else more effective; for example, in terms of the route length.

For the method, it is advantageous if the quality of the signal transmission is determined by measurement of the signal-to-noise ratio (SNR) and/or of the bit error rate (BER) and/or of the signal field strength (RSSI=Received Signal Strength Indicator) and/or of the packet error rate (PER) and/or of the error vector magnitude (EVM).

Furthermore, it is also advantageous if one communication terminal is used as an intermediate station. This makes it possible, for example, for three mobile radio terminals to communicate with one another without having to use an intermediate node in the form of a base station. This also makes it possible to save resources, such as in the mobile radio network since, for example, short-distance connections from mobile radio terminals no longer have to pass via the base stations, thus allowing their energy consumption to be reduced and the resources of the air interface to be protected.

In the inventive method, it is also intended that one intermediate station and/or one communication terminal request or requests the respective adjacent intermediate stations and/or communication terminals to communicate with one another if it has/they have a poorer signal transmission quality to the predecessor station than do the subsequent intermediate stations and/or communication terminals to the same predecessor station.

A request such as this can be communicated between two devices by, for example, interchanging messages. An intermediate station, which is actually superfluous for a transmission, signals to the two nodes which are intended to be connected to one another the transmission and reception resources which are required by each of them. In the simplest case, the intermediate station signals to a first node the resource on which it can receive the other second node. The second node is signaled by the intermediate station the resource on which it can receive the first node. Furthermore, a switching time must be agreed with by the two nodes, in order that both nodes switch in synchronism.

Alternatively and in addition to this, one intermediate station and/or one communication terminal can be requested by the respectively adjacent intermediate station and/or communication terminals to disconnect the connection to the respectively adjacent intermediate stations and/or communication terminals if it has/they have a poorer signal transmission quality to the predecessor station than the adjacent intermediate stations and/or communication terminals to the same predecessor station. In this situation, it also would be advantageous for the intermediate node to be disconnected to carry out the coordination process, because it already has a connection to the two other nodes involved, in any case.

It may be advantageous to define a threshold value for the signal transmission quality below which, if this threshold value is undershot, a communication terminal and/or an intermediate station searches for connections to other intermediate stations and/or communication terminals with a better signal transmission quality.

Additional features and advantages of the present invention are described in, and will be apparent from, the following Detailed Description of the Invention and the Figures.

DETAILED DESCRIPTION OF THE FIGURES

DETAILED DESCRIPTION OF THE INVENTION

Figure 1:
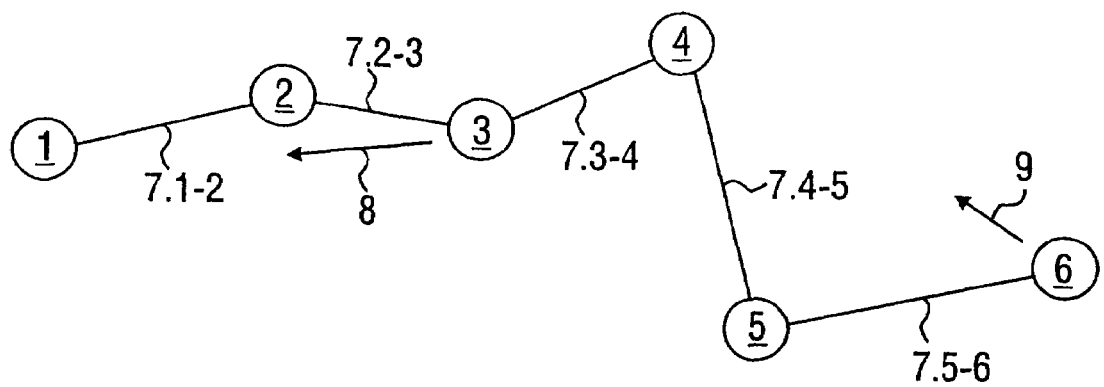
FIG. 1 shows a schematic illustration of a communication connection between two terminals in a mobile radio network and via two or more intermediate nodes.

FIG. 1 uses a schematic illustration to show communication connections 7.1-2, 7.2-3, 7.3-4, 7.4-5 and 7.5-6 between two terminals 1 and 6 in a mobile radio network via two or more intermediate nodes 2 to 5. The intermediate node 2, the intermediate node 4 and the intermediate node 5 may, for example, be fixed base stations in the mobile radio network. The intermediate node 3 is, in this illustration, assumed to be mobile; for example, a mobile base station which is moving towards the first terminal 1. The second terminal 6 is also assumed to be moving; to be precise, towards the intermediate node 4. The movement of the intermediate node 3 towards the first terminal 1, and the movement of the second terminal 6 towards the intermediate node 4 are indicated by the arrows with the reference symbols 8 and 9.

In the inventive method, each intermediate node 2 to 5 signals its own reception resource to the predecessor node, to its successor node (next hop) or to the adjacent terminal 1 or 6. The nodes on the reception resources of their predecessor nodes at regular and cyclic intervals measure at least one variable which characterizes the quality of the message transmission, for example the signal-to-noise ratio or the bit error rate, and signal the measurement result to the associated predecessor node. This message need not be sent if the measurement result indicates reception below a fixed minimum threshold.

When an intermediate node receives a measurement result such as this, it decides on the basis of its own measurements and on the received results for its next hop whether it will still be involved in the multihop connection. If this is not the case, it initiates with the predecessor node and the successor node, a procedure with the aim of setting up a direct connection between them. The inventive method as shown in FIG. 1 will be explained with reference to the intermediate nodes 2 and 5.

The intermediate node 3 is approaching the vicinity of the first terminal 1. Analogously, the second terminal 6 is approaching the intermediate node 4. This is symbolized by the arrows 8 and 9.

In the case of the inventive method, the intermediate node 2 signals to the terminal 1 its reception resource from the direction of the intermediate node 3. By way of example, the frequency and the time slot for the connection 7.2-3 between the intermediate node 2 and the intermediate node 3 are thus transmitted to the terminal 1. Furthermore, the intermediate node 2 signals to the intermediate node 3 its reception resource from the direction of the terminal 1; that is to say, for example, the frequency and the time slot of the connection 7.1-2.

The terminal 1 regularly measures the reception, that is to say, by way of example, the signal-to-noise ratio of the reception resource signaled to it, such as on the connection 7.2-3, and sends its results to the intermediate node 3. In a corresponding manner, the intermediate node 3 regularly measures the reception on the reception resource signaled to it, that is to say on the connection 7.1-2, and sends its results to the intermediate node 2, as well.

Whenever the intermediate node 2 receives a measurement result from the terminal 1, it compares this measurement result with its own measurements relating to reception on the connection 7.2-3.

In a corresponding manner, the intermediate node 2 receives a measurement result from the intermediate node 3, and compares this with its own measurements relating to reception on the connection 7.1-2.

If the intermediate node 2 finds during the comparison process that the terminal 1 is receiving better on the connection 7.2-3 than it is itself, it initiates its own exit or its removal from the connection. The same applies to the comparison relating to the connection 7.1-2.

This process for the intermediate node 5 operates analogously to the removal/exit from the connection of the intermediate node 2. In the inventive method, the intermediate node 5 signals to the intermediate node 4 its reception resource from the direction of the terminal 6. Thus, by way of example, the frequency and the time slot of the connection 7.5-6 are transmitted between the intermediate node 5 and the terminal 6 to the intermediate node 4. Furthermore, the intermediate node 5 signals to the terminal 6 its reception resource from the direction of the intermediate node 4; that is to say, from the direction of the connection 7.4-5.

The intermediate node 4 regularly measures the reception on the reception resource signaled to it, that is to say, on the connection 7.5-6 (by way of example, the signal-to-noise ratio) and sends its results to the intermediate node 5. In a corresponding manner, the terminal 6 also regularly measures the reception on the reception resource signaled to it, that is to say on the connection 7.4-5, and sends its results to the intermediate node 5, as well.

Whenever the intermediate node 5 receives a measurement result from the intermediate node 4, it compares this with its own measurements relating to the reception on the connection 7.5-6. In a corresponding manner, the intermediate node 5 receives a measurement result from the terminal 6, and compares this with its own measurements relating to reception on the connection 7.4-5.

If, during the comparison process, the intermediate node 5 finds that the intermediate node 4 is receiving better than it is itself on the connection 7.5-6, it initiates its own exit or its removal from the connection. The same applies to the comparison relating to the connection 7.4-5.

Figure 2:
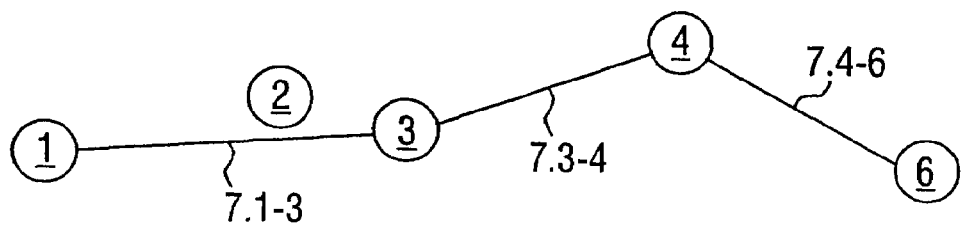
FIG. 2 shows the communication connection from FIG. 1, following the use of the inventive method.
Figure 2:

FIG. 2 shows the new communication connections for the two terminals 1 and 6, following the use of the inventive method. The first terminal 1 has a new connection 7.1-3 to the intermediate node 3. The connections 7.1-2 and 7.2-3 (FIG. 1) to the intermediate node 2 have been disconnected. The second terminal 6 also has a new connection 7.4-6 to the intermediate node 4. The connections 7.4-5 and 7.5-6 (FIG. 1), which have now become poor, have also been disconnected. The intermediate nodes 2 and 5, which are not used for the communication or are no longer required for the communication, are nevertheless illustrated in FIG. 2, for the sake of clarity. This "removal" of two intermediate nodes 2 and 5 on the one hand makes it possible to shorten the route length between the two terminals 1 and 6, while it is also possible to save power by the removal of intermediate nodes.

Figure 3:
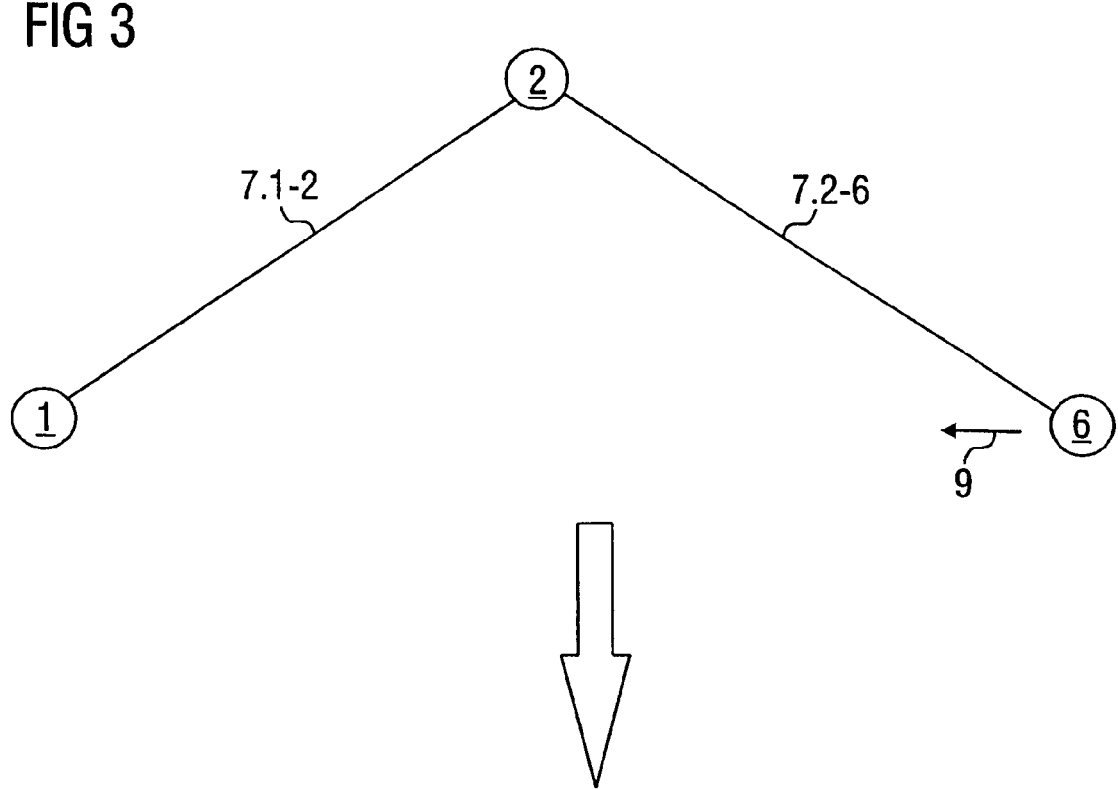
FIG. 3 shows a schematic illustration of a communication connection between two terminals in a mobile radio network via an intermediate node, with one terminal approaching the position of the second terminal.

FIG. 3 uses a schematic illustration to show the communication connections 7.1-2 and 7.2-6 between two terminals 1 and 6 in a mobile radio network via an intermediate node 2. The second terminal 6 is moving towards the first terminal 1. This is symbolized by the arrow with the reference symbols 9.

In the inventive method, analogously to the description relating to FIG. 1, each component of the communication path, that is to say the intermediate node 2 and the terminals 1 and 6, determines its own reception resource and/or the quality of the received signal, and signals the result to the adjacent terminal 1 and 6 or to the intermediate node 2. By way of example, the intermediate node 2 determines the field strength of the signal, and transmits the result to the first terminal 1 and to the second terminal 6. The terminals 1 and 6 also determine the field strength of the signal, and transmit the result to the intermediate node 2.

As a result of the local proximity of the second terminal 6 to the first terminal 1, a field strength measurement of the signal which is transmitted from the intermediate node 2 at a specific time indicates that the transmission situation between the two terminals 1 and 6 is better than via the "circuitous route" via the intermediate node 2. The intermediate node 2 starts a procedure which causes the two terminals 1 and 6 to set up a new connection between them.

Figure 4:
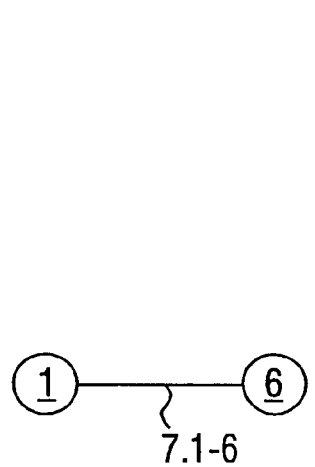
FIG. 4 shows the communication connection from FIG. 3, following the use of the inventive method.

This situation is illustrated in FIG. 4. The previous connections 7.1-2 and 7.2-6 from FIG. 3 from the first terminal 1 to the intermediate node and from the intermediate node to the second terminal 6 have been disconnected. The two terminals 1 and 6 now have a direct connection 7.1-6. The intermediate node 2, which is not used for this connection 7.1-6, is nevertheless illustrated in FIG. 4.

Conversely, when the two terminals 1 and 6 move apart from one another again by the inventive method, the intermediate node 2, which now is not being used, could once again be used for communication between the two terminals 1 and 6. The connections 7.1-2 and 7.2-6 from FIG. 3 would then be set up again.

Overall, the cyclic measurement of the signal transmission quality from the direction of the predecessor node and the transmission of the measured signal transmission quality at least to one adjacent intermediate station or at least to one adjacent communication terminal and each intermediate station and each communication terminal comparing its own measured signal transmission quality and the transmitted signal transmission quality, and disconnecting existing connections and making new connections as a function of the comparison, via the novel method, results in the provision of a novel method which, in comparison to the already known methods, allows a connection between communication terminals to be set up automatically, quickly and more effectively, via a better route length, or else allows direct connections between communication terminals.

It is self-evident that the features of the present invention mentioned above can be used not only in the respectively stated combination but also in other combinations or on their own without departing from the scope of the present invention.

Although the present invention has been described with reference to specific embodiments, those of skill in the art will recognize that changes may be made thereto without departing from the spirit and scope of the present invention as set forth in the hereafter appended claims.

The invention claimed is:

1. A method for operation of a communication path between at least two communication terminals, comprising:
connecting, at least at a start time, the at least two communication terminals via at least one intermediate station;
interchanging signals between the at least two communication terminals via the communication path, wherein within the communication path in at least one intermediate station, signals are received from at least one predecessor station, and signals are transmitted to at least one successor station;
determining, via at least two of (i) at least one intermediate station and (ii) at least one communication terminal, a first signal transmission quality from a direction of a respective predecessor station, wherein the first signal transmission quality comprises a received signal field strength;
cyclically measuring, via at least two of (i) at least one intermediate station and (ii) at least one communication terminals, a second signal transmission quality from the direction of a respective predecessor station to a respective successor station, wherein the second signal transmission quality comprises a received signal field strength;

transmitting, via at least two of (i) at least one intermediate station and (ii) at least one communication terminal, the second signal transmission quality to at least one of one adjacent intermediate station and one adjacent communication terminal;

comparing, in at least one of (i) at least one intermediate station and (ii) at least one communication terminal, the first signal transmission quality with the second signal transmission quality;

disconnecting existing connections; and making new connections based on comparing the first signal transmission quality and the second signal transmission quality.

2. A method for operation of a communication path between at least two communication terminals as claimed in claim 1, wherein the first signal transmission quality further comprises at least one of a signal-to-noise ratio, a bit error rate, a packet error rate and an error vector magnitude.

3. A method for operation of a communication path between at least two communication terminals as claimed in claim 1, wherein one of the at least two communication terminals is also used as an intermediate station.

4. A method for operation of a communication path between at least two communication terminals as claimed in claim 1, wherein at least one of one intermediate station and one of the at least two communication terminals requests at least one of the respective adjacent intermediate stations and the at least two communication terminals to communicate with one another if it has a poorer first signal transmission quality to the respective predecessor station than the second transmission quality of at least one of the subsequent intermediate stations and the at least two communication terminals to the same respective predecessor station.

5. A method for operation of a communication path between at least two communication terminals as claimed in claim 1, wherein at least one of one intermediate station and one communication terminal is requested by at least one of the respectively adjacent intermediate stations and the at least two communication terminals to disconnect the connection to at least one of the respectively adjacent intermediate stations and the at least two communication terminals if it has a poorer first signal transmission quality than the second signal transmission quality of at least one of the adjacent intermediate stations and the at least two communication terminals.

6. A method for operation of a communication path between at least two communication terminals as claimed in claim 1, wherein, if a specific threshold value for the first signal transmission quality of at least one of one communication terminal and one intermediate station is undershot, it respectively searches for connections to other intermediate stations and communication terminals with a better first signal transmission quality.

7. A method for operation of a communication path between at least two communication terminals as claimed in claim 1, wherein two communication terminals determine the first signal transmission quality and one intermediate station determines the first signal transmission quality.

8. A method for operation of a communication path between at least two communication terminals as claimed in claim 1, wherein two communication terminals determine the first signal transmission quality and at least two intermediate stations determine the first signal transmission quality.

9. A method for operation of a communication path between at least two communication terminals as claimed in claim 1, wherein one communication terminal determines the first signal transmission quality and one intermediate station determines the first signal transmission quality.

10. A method for operation of a communication path between at least two communication terminals as claimed in claim 1, wherein one communication terminal determines the first signal transmission quality and at least two intermediate stations determine the first signal transmission quality.

11. A method for operation of a communication path between at least two communication terminals as claimed in claim 1, wherein no communication terminals determine the first signal transmission quality and at least two intermediate stations determine the first signal transmission quality.

12. A method for operation of a communication path between at least two communication terminals as claimed in claim 1, wherein all communication terminals determine the first signal transmission quality and all intermediate stations determine the first signal transmission quality.

13. A method for operation of a communication path between at least two communication terminals as claimed in claim 1, wherein at least one communication terminal does not determine the first signal transmission quality and at least one intermediate station does not determine the first signal transmission quality.

14. A method for operation of a communication path between at least two communication terminals as claimed in claim 1, wherein the predecessor station is a communication terminal.

15. A method for operation of a communication path between at least two communication terminals as claimed in claim 1, wherein the predecessor station is an intermediate station.

16. A method for operation of a communication path between at least two communication terminals as claimed in claim 1, wherein the successor station is a communication terminal.

17. A method for operation of a communication path between at least two communication terminals as claimed in claim 1, wherein the successor station is an intermediate station.

18. A method for operation of a communication path between at least two communication terminals as claimed in claim 1, wherein the predecessor station is a communication terminal and the successor station is a communication terminal.

19. A method for operation of a communication path between at least two communication terminals as claimed in claim 1, wherein the predecessor station is a intermediate station and the successor station is an intermediate station.

20. A method for operation of a communication path between at least two communication terminals as claimed in claim 1, wherein one intermediate station compares the first signal transmission quality with the second signal transmission quality.

21. A method for operation of a communication path between at least two communication terminals as claimed in claim 1, wherein one communication terminal compares the first signal transmission quality with the second signal transmission quality.

22. A method for operation of a communication path between at least two communication terminals as claimed in claim 1, wherein at least one intermediate station compares the first signal transmission quality with the second signal transmission quality and at least one communication terminal compares the first signal transmission quality with the second signal transmission quality.

23. A method for operation of a communication path between at least two communication terminals as claimed in claim 1, wherein based on comparing the first signal transmission quality and the second signal transmission quality, existing connections of at least one intermediate station are disconnected.

24. A method for operation of a communication path between at least two communication terminals as claimed in claim 1, wherein based on comparing the first signal transmission quality and the second signal transmission quality, at least one intermediate station eliminates itself from the communication path.

* * * * *